April 21, 1931.  L. O. GRONDAHL ET AL  1,802,014
ELECTRICAL APPARATUS
Filed May 17, 1929
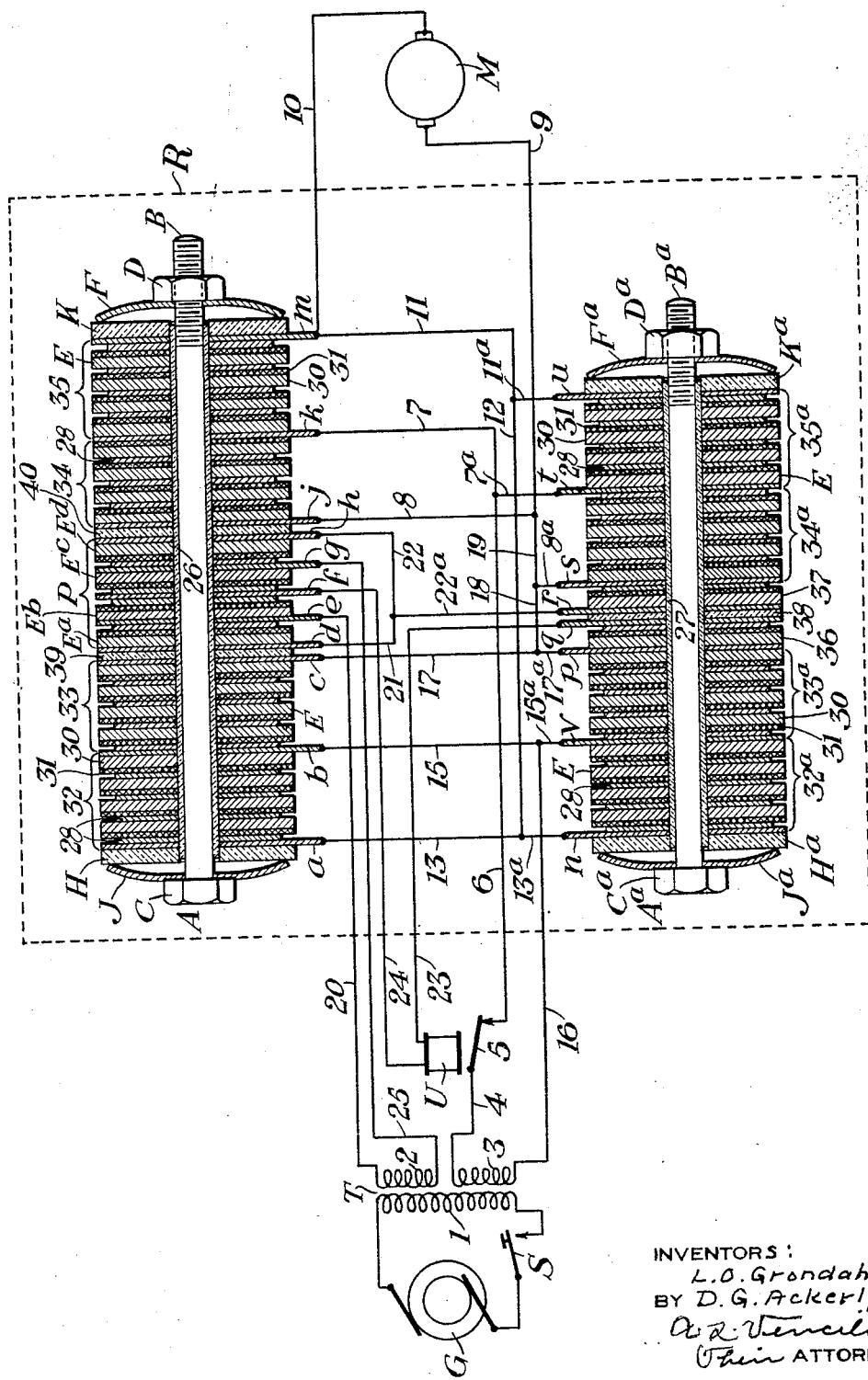
INVENTORS:
L. O. Grondahl,
BY D. G. Ackerly,
ATTORNEY Patented Apr. 21, 1931

1,802,014

UNITED STATES PATENT OFFICE

LARS O. GRONDAHL, OF PITTSBURGH, AND DONALD G. ACKERLY, OF EDGEWOOD, PENN-SYLVANIA, ASSIGNORS TO THE UNION SWITCH & SIGNAL COMPANY, OF SWISSVALE, PENNSYLVANIA, A CORPORATION OF PENNSYLVANIA

ELECTRICAL APPARATUS

Application filed May 17, 1929. Serial No. 363,851.

Our invention relates to electrical apparatus, and particularly to apparatus for supplying a load with unidirectional current from a source of alternating current through a rectifying device.

One object of our invention is the provision, in apparatus of the type described, of means for disconnecting the source of alternating current from the rectifying device if the temperature of the rectifying device becomes excessive.

We will describe one form of apparatus embodying our invention, and will then point out the novel features thereof in claims.

The accompanying drawing is a view, partly diagrammatic, and partly cross-sectioned, showing one form of apparatus embodying our invention.

Referring to the drawing, the reference character R designates, in general, a rectifying device which in the form here shown consists of two full wave rectifiers A and $A^a$ connected in multiple. Each full wave rectifier is made up of a plurality of asymmetric units E, each comprising a flat disk 30 of metal, such as copper, having a coating 31 of a compound of the metal, such as cuprous oxide formed thereon. As is well known, units of the type described exhibit the characteristic of offering a lower resistance to current which tends to flow from the oxide to the copper than to current flowing in the opposite direction.

The units E comprising the rectifier A are assembled on a bolt B, which passes through suitable openings in the units, but which is separated from the units by a sleeve 26 of insulating material. In similar manner, the units E comprising the rectifier $A^a$ are assembled on a bolt $B^a$, which passes through suitable openings in the units, and which is separated from the units by a sleeve 27 of insulating material. Adjacent the oxide coating 31 of each unit E in both rectifiers is placed a thin layer 28 of an impressionable conducting material, such for example as lead foil. Interposed at suitable intervals in rectifier A are a plurality of metal washers $a$, $b$, $c$, $j$, $k$, and $m$, which serve as terminals for the rectifiers. Similar metal washers, $n$, $v$, $p$, $q$, $s$, $t$, and $u$ are inserted at intervals in rectifier $A^a$. The rectifier A is divided into four sections 32, 33, 34, and 35, and the rectifier $A^a$ is divided into four similar sections $32^a$, $33^a$, $34^a$, and $35^a$. Each section constitutes one leg of a full wave rectifier, and each comprises, as here shown, four units in series. Pressure is applied to rectifier A by means of a nut D screwed on bolt B, and pressure is applied to rectifier $A^a$ by means of a nut $D^a$ screwed on bolt $B^a$. Interposed between the head C of the bolt B and one end of rectifier A is a spring washer J and an insulating washer H, and interposed between the nut D and the other end of rectifier A is a spring washer F and an insulating washer K. In similar manner, interposed between the head $C^a$ of the bolt $B^a$, and one end of rectifier $A^a$ is a spring washer $J^a$ and an insulating washer $H^a$, and interposed between the nut $D^a$ and the other end of rectifier $A^a$ is a spring washer $F^a$ and an insulating washer $K^a$. The insulating washers H, K, $H^a$ and $K^a$ serve to insulate the ends of the rectifiers from the bolts, while the spring washers J, F, $J^a$ and $F^a$ tend to maintain a uniform pressure on the rectifiers. The rectifying device R may be used to supply unidirectional current to a load from a source of alternating current. As here shown, the rectifying device R is arranged to supply unidirectional current to a direct current motor M from the secondary 3 of a transformer T, the primary 1 of which is at times connected with an alternator G over a switch S. When switch S is closed current flows, during half cycles of one polarity, from secondary 3 of transformer T, through wire 4, back contact 5 of a relay U, wires 6 and 7, metal washer $k$, section 34 of rectifier A, metal washer $j$, wires 8 and 9, motor M, wires 10, 11, 12 and 13, metal washer $a$, section 32 of rectifier A, metal washer $b$, and wires 15 and 16 back to secondary 3 of transformer T. It will be seen that sections $34^a$ and $32^a$ of rectifier $A^a$ are connected in parallel with sections 34 and 32 of rectifier A, so that under the conditions just described current also flows from secondary 3 of transformer T, through wire 4, back contact 5 of relay U, wires 6 and 7ᵃ, metal washer t, section 34ᵃ of rectifier Aᵃ, metal washer s, wires 8ᵃ, 19 and 9, armature of motor M, wires 10, 11, 12 and 13ᵃ, metal washer n, section 32ᵃ of rectifier Aᵃ, metal washer v, and wires 15 and 16 back to secondary 3 of transformer T. During half cycles of the opposite polarity, current flows from secondary 3 of transformer T through wires 16 and 15, metal washer b, section 33 of rectifier A, metal washer c, wires 17, 18, 19 and 9, armature of motor M, wire 10, metal washer m, section 35 of rectifier A, metal washer k, wires 7 and 6, back contact 5 of relay U, and wire 4 back to secondary 3 of transformer T. At the same time, current flows from secondary 3 of transformer T through wires 16 and 15ᵃ, metal washer v, section 33ᵃ of rectifier Aᵃ, metal washer p, wires 17ᵃ, 18, 19 and 9, armature of motor M, wires 10, 11 and 11ᵃ, metal washer u, section 35ᵃ of rectifier Aᵃ, metal washer t, wires 7ᵃ and 6, back contact 5 of relay U and wire 4 back to secondary 3. When switch S is closed, therefore, motor M is supplied with unidirectional current which operates the motor. Motor M may be used to control any suitable apparatus not shown in the drawing.

When current is supplied to a load through a rectifying device of the type described, heat is developed in the rectifying device due to its resistance, and the temperature of the device rises. The temperature of the device continues to rise until the rate at which heat is dissipated by the device is equal to the rate at which heat is developed in the device. It is sometimes desirable to supply a comparatively large current intermittently to a load through a rectifying device of the type described. This current normally does not flow long enough to overheat the rectifying device, but if the period of time during which this current flows is prolonged for any reason, or if the amount of the current flowing through the rectifying device is increased above the normal value, the rectifying device might become overheated. If the temperature of the device becomes too high, the rectifying device might be damaged. To prevent the rectifying device from becoming too hot, we provide means for energizing relay U when the temperature of the device reaches a predetermined value which is below the value necessary to damage the rectifying device. As here shown, we have inserted in rectifier Aᵃ two resistance units 36 and 37, which are separated by a thin disk 38 of some material, such as mica, having high electrical resistance but the heat conductivity of which is good when compared with its electrical conductivity. Metal washers are placed adjacent units 36 and 37 to facilitate electrical connection therewith. The units 36 and 37 have a high negative temperature coefficient of resistance, and may for example be asymmetric units which are similar to the asymmetric units E already described. Furthermore, we interpose in rectifier A an auxiliary rectifier P comprising four additional asymmetric units Eᵃ, Eᵇ, Eᶜ and Eᵈ, which are similar to asymmetric units E and metal contact washers d, e, f, g and h. The rectifier P is insulated from rectifier A by two electro-insulating heat conducting disks 39 and 40, which are similar to the disk 38 described above. The auxiliary rectifier P, and the resistance units 36 and 37 are included in a circuit for relay U. When switch S is closed, current flows during half cycles of one polarity, from secondary 2 of transformer T through wire 20, metal washer e, asymmetric unit Eᵃ metal washer d, wires 21 and 22ᵃ, metal washer r, resistance unit 37 in the high resistance direction, metal washer s, wires 8ᵃ, 18 and 17ᵃ metal washer p, resistance unit 36 in the high resistance direction, metal washer q, wire 23, winding of relay U, wire 24, metal washer f, asymmetric unit Eᶜ, metal washer g, and wire 25 back to secondary 2 of transformer T. During half cycles of the opposite polarity current flows from secondary 2 of transformer T through wire 25, metal washer g, asymmetric unit Eᵈ, metal washer h, wires 22 and 22ᵃ, metal washer r, resistance unit 37 in the high resistance direction, metal washer s, wires 8ᵃ, 18 and 17ᵃ, metal washer p, resistance unit 36 in the high resistance direction, metal washer q, wire 23, winding of relay U, wire 24, metal washer f, asymmetric unit Eᵇ, metal washer e, and wire 20 back to secondary 2.

The operation of the apparatus is as follows: When switch S is closed unidirectional current is supplied to motor M from secondary 3 of transformer T through rectifiers A and Aᵃ connected in multiple, and current is also supplied to relay U from secondary 2 of transformer T through auxiliary rectifier P and resistance units 36 and 37. The units 36 and 37 are in good thermal connection with the rest of the units in rectifier Aᵃ, and it follows that the units 36 and 37 will have approximately the same temperature as the rest of the units in rectifier Aᵃ. The parts are proportioned in such manner that as long as the rectifiers are below a predetermined temperature which is less than that which would damage the rectifiers, the current supplied to relay U through units 36 and 37 is not sufficient to pick up relay U. When the temperature of rectifier Aᵃ becomes excessive, however, the resistances of the units 36 and 37, through which the current flows in the high resistance direction, are reduced to such an extent, that the current now supplied to relay U picks up the relay. Contact 5 of the relay is then opened, and secondary 3 of transformer T is disconnected from the rectifying device. The secondary 3 of transformer T will remain disconnected from the rectifying device until the rectifiers A and A^a have cooled to the temperature at which the resistance of units 36 and 37 becomes sufficiently high to cause relay U to open. When this occurs secondary 3 of transformer T is again connected to load M through rectifiers A and A^a in multiple, and if switch S is still closed, the load will be supplied with unidirectional current until the temperature of the rectifiers A and A^a again becomes excessive.

The auxiliary rectifier P is placed in rectifier A to get more constant operation. The output of the auxiliary rectifier changes slightly with temperature, and if the units of the auxiliary rectifier were placed outside the main rectifier, the temperature at which relay U would close would depend to some extent upon the ambient temperature. By placing the auxiliary rectifier P in the rectifier A, the temperature of rectifier P will stay at approximately the same temperature as rectifier A. Rectifier A is similar to, and operates in multiple with, rectifier A^a, and carries approximately the same load, so that the temperature of rectifier A will be nearly the same as the temperature of rectifier A^a. It follows that rectifier P will have approximately the same temperature as rectifier A^a. The temperature at which relay U closes is dependent upon the temperature of rectifier A^a, and since rectifier P stays at approximately the same temperature as rectifier A^a it follows that with rectifier P mounted in rectifier A, the temperature at which relay U will close is independent of the ambient temperature.

While we have shown the rectifying device R as comprising two rectifiers A and A^a, one or more rectifiers might just as easily be used, depending upon the conditions. If one rectifier only is used, both the auxiliary rectifier P, and the units 36 and 37 would then be assembled in the one rectifier. When more rectifiers are used, resistance units 36 and 37 might also be assembled in each rectifier. Furthermore, only one resistance unit might be used when desired, or a number of resistance units 36 and 37 connected in series or in multiple might be used. In some instances, a number of resistance units might be located at different locations in the same rectifier to insure against one portion of the rectifier being excessively heated.

Although we have herein shown and described only one form of electrical apparatus embodying our invention, it is understood that various changes and modifications may be made therein within the scope of the appended claims without departing from the spirit and scope of our invention.

Having thus described our invention, what we claim is:

1. In combination, a first asymmetric unit, a second asymmetric unit having a high negative temperature coefficient of resistance and associated with said first unit in good heat transferring relation, a contact arranged to open when the resistance of said second unit in the high resistance direction decreases below a predetermined value, a load, and means controlled by said contact for supplying said load with current through said first unit.

2. In combination, a rectifying device comprising a plurality of asymmetric units, a load, a source of alternating current connected with said load through said rectifying device, a resistance unit having a high negative temperature coefficient of resistance and interposed between two adjacent asymmetric units of said device in good heat transferring relation, and means controlled by said resistance unit for disconnecting said source from said load if the temperature of said rectifying device becomes excessive.

3. In combination, a rectifying device comprising two asymmetric units connected in multiple, an auxiliary rectifier in good heat transferring relation with one of said asymmetric units, a resistance unit having a high negative temperature coefficient of resistance in good heat transferring relation with the other of said units, a relay, means for supplying said relay with current through said auxiliary rectifier and said resistance unit, a load, and means controlled by said relay for supplying said load with current through said rectifying device.

4. In combination, a rectifying device comprising a plurality of asymmetric units arranged to provide full wave rectification, a load, a contact, a source of alternating current connected with said load through said contact and said rectifying device, an auxiliary rectifier in good heat transferring relation with said rectifying device but electrically insulated therefrom, a resistance unit in good heat transferring relation with said rectifying device but electrically insulated therefrom and having a high negative temperature coefficient of resistance, a winding for controlling said contact, and means for supplying said winding with current through said auxiliary rectifier and said asymmetric unit.

5. In combination, a rectifying device comprising two full wave rectifiers connected in multiple, an auxiliary rectifier in good thermal connection with one of said rectifiers, a plurality of resistance units in good thermal connection with the other of said rectifiers and each having a high negative temperature coefficient of resistance, a source of alternating current, a relay connected with said source through said resistance units in series and through said auxiliary rectifier, a load, and means controlled by said relay for at times connecting said source with said load through said rectifying device.

In testimony whereof we affix our signatures.

LARS O. GRONDAHL.
DONALD G. ACKERLY.